United States Patent
Deak et al.

(10) Patent No.: US 10,270,139 B1
(45) Date of Patent: Apr. 23, 2019

(54) SYSTEMS AND METHODS FOR RECYCLING ELECTROCHEMICAL ENERGY STORAGE DEVICES

(71) Applicant: Ambri Inc., Cambridge, MA (US)

(72) Inventors: David S. Deak, Cambridge, MA (US); Ivana Polim, Cambridge, MA (US); David J. Bradwell, Boston, MA (US); Paul Burke, Framingham, MA (US)

(73) Assignee: AMBRI INC., Marlborough, MA (US)

( * ) Notice: Subject to any disclaimer, the term of this patent is extended or adjusted under 35 U.S.C. 154(b) by 20 days.

(21) Appl. No.: 14/975,587

(22) Filed: Dec. 18, 2015

Related U.S. Application Data

(63) Continuation of application No. 14/210,051, filed on Mar. 13, 2014.

(60) Provisional application No. 61/785,571, filed on Mar. 14, 2013.

(51) Int. Cl.
*C22B 26/12* (2006.01)
*H01M 10/54* (2006.01)

(52) U.S. Cl.
CPC ............. *H01M 10/54* (2013.01); *C22B 26/12* (2013.01)

(58) Field of Classification Search
CPC .................................................. H01M 10/54
See application file for complete search history.

(56) References Cited

U.S. PATENT DOCUMENTS

| | | |
|---|---|---|
| 2,587,443 A | 2/1952 | Crabtree |
| 3,057,946 A | 10/1962 | Eidensohn |
| 3,238,437 A | 3/1966 | Foster et al. |
| 3,245,836 A | 4/1966 | Agruss |
| 3,419,432 A | 12/1968 | Hesson |
| 3,488,221 A | 1/1970 | Hiroshi et al. |
| 3,507,703 A | 4/1970 | Heredy |
| 3,535,214 A | 10/1970 | Winand |
| 3,607,405 A | 9/1971 | Christopher |
| 3,607,407 A | 9/1971 | Adams |
| 3,635,765 A | 1/1972 | Greenberg |
| 3,663,295 A | 5/1972 | Baker |
| 3,716,409 A | 2/1973 | Cairns et al. |

(Continued)

FOREIGN PATENT DOCUMENTS

| | | |
|---|---|---|
| AU | 2014229643 A1 | 9/2015 |
| AU | 2016225020 A1 | 9/2017 |

(Continued)

OTHER PUBLICATIONS

Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami. 6b02576. Epub May 5, 2016. With supporting information.

(Continued)

*Primary Examiner* — Melvin C. Mayes
*Assistant Examiner* — Michael Forrest
(74) *Attorney, Agent, or Firm* — Wilson Sonsini Goodrich & Rosati

(57) ABSTRACT

The present disclosure provides systems and methods for dismantling and/or recycling liquid metal batteries. Such methods can include cryogenically freezing liquid metal battery components, melting and separating liquid metal battery components, and/or treating liquid metal battery components with water.

23 Claims, 10 Drawing Sheets

(56) References Cited

U.S. PATENT DOCUMENTS

| | | |
|---|---|---|
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,338,380 A | 7/1982 | Erickson et al. |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough, Jr. et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,039,351 A | 8/1991 | Cooper et al. |
| 5,139,895 A | 8/1992 | Roy et al. |
| 5,185,068 A | 2/1993 | Sadoway |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A * | 2/1996 | Kawakami ............... C22B 7/005 205/59 |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | MacKenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,856,041 A | 1/1999 | Inoue et al. |
| 5,874,183 A | 2/1999 | Uematsu |
| 5,939,221 A * | 8/1999 | Tsuchimoto ........... H01M 10/54 429/104 |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |

(56) References Cited

U.S. PATENT DOCUMENTS

| | | |
|---|---|---|
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,568,537 B2 | 8/2009 | King et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,877,120 B2 | 1/2011 | Jacobs et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 | 8/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,925,881 B2 | 3/2018 | Manotas, Jr. et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2006/0127735 A1 | 6/2006 | Sabin et al. |
| 2006/0151333 A1 | 7/2006 | Banek |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1* | 2/2008 | Sadoway ............ H01M 2/0252 429/149 |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2011/0014503 A1 | 1/2011 | Bradwell et al. |
| 2011/0014505 A1 | 1/2011 | Bradwell et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |

(56) References Cited

U.S. PATENT DOCUMENTS

| | | |
|---|---|---|
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0104990 A1 | 5/2012 | Boysen et al. |
| 2012/0107675 A1 | 5/2012 | Kim |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0183838 A1 | 7/2012 | An et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | La et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0349159 A1 | 11/2014 | Bartling et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0263951 A1 | 9/2017 | Kanno et al. |
| 2018/0034110 A1 | 2/2018 | Sudworth et al. |
| 2018/0083274 A1 | 3/2018 | Martin |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 101436780 A | 5/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 102498589 A | 6/2012 |
| CN | 102646808 A | 8/2012 |
| CN | 103001239 A | 3/2013 |
| CN | 202797170 U | 3/2013 |
| CN | 105190984 A | 12/2015 |
| CN | 105659415 A | 6/2016 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H1012270 A | 1/1998 |
| JP | H117923 A | 1/1999 |

(56) References Cited

FOREIGN PATENT DOCUMENTS

| | | | |
|---|---|---|---|
| JP | 2001115369 A | 4/2001 |
| JP | 2001243994 A | 9/2001 |
| JP | 3355377 B2 | 12/2002 |
| JP | 2007157373 A | 6/2007 |
| JP | 2010012270 A | 1/2010 |
| JP | 2010208771 A | 9/2010 |
| JP | 2010535942 A | 11/2010 |
| JP | 2011508379 A | 3/2011 |
| JP | 2012124009 A | 6/2012 |
| JP | 2012226866 A | 11/2012 |
| JP | 2012533865 A | 12/2012 |
| JP | 2013537361 A | 9/2013 |
| JP | 2014154337 A | 8/2014 |
| JP | 2016510936 A | 4/2016 |
| JP | 2016535392 A | 11/2016 |
| KR | 20120059106 A | 6/2012 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008105811 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015063588 A2 | 5/2015 |
| WO | WO-2015066359 A1 | 5/2015 |
| WO | WO-2016138499 A1 | 9/2016 |

OTHER PUBLICATIONS

Li, et al. Liquid Metal Electrodes for Energy Storage Batteries. Advanced Energy Materials (2016) 6:1600483-1-19. DOI: 10.1002/aenm.201600483. Published May 31, 2016.
Notice of allowance dated Jul. 5, 2016 for U.S. Appl. No. 14/178,806.
Notice of allowance dated Jul. 25, 2016 for U.S. Appl. No. 14/286,369.
Office action dated Jun. 30, 2016 for U.S. Appl. No. 14/536,563.
Ouchi, et al. Calcium-based multi-element chemistry for grid-scale electrochemical energy storage. Nat Commun. Mar. 22, 2016;7:10999. doi: 10.1038/ncomms10999. With supplementary materials.
Cerablak™ technology. Atfi Surface Science Solutions. http://www.atfinet.com/index.php/technology. Accessed Feb. 24, 2016.
Co-pending U.S. Appl. No. 15/063,842, filed Mar. 8, 2016.
Co-pending U.S. Appl. No. 15/130,129, filed Apr. 15, 2016.
Co-pending U.S. Appl. No. 15/130,292, filed Apr. 15, 2016.
Co-pending U.S. Appl. No. 15/140,434, filed Apr. 27, 2016.
International preliminary report on patentability dated Mar. 31, 2016 for PCT Application No. PCT/US2014/056367.
Notice of allowance dated Mar. 8, 2016 for U.S. Appl. No. 13/801,333.
Advisory Action Before Filing of Appeal Brief dated May 10, 2012 for U.S. Appl. No. 12/839,130.
Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Allanore, A. Features and Challenges of Molten Oxide Electrolytes for Metal Extraction. Journal of the Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Chuang. Floating capacitor active charge balancing for PHEV application. Thesis. Ohio State University. 2010.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Cubicciotti, et al. Metal-Salt Interactions at High Temperatures: The Solubilities of Some alkaline Earth Metals in their Halides. J. Am. Chem. Soc. 1949; 71(6):2149-2153.
Donald Sadoway: The Colbert Report video. http://thecolbertreport.cc.com/videos/8uddyg/donald-sadoway. The Colbert Report, Oct. 22, 2012. Accessed Jun. 29, 2015.

(56) References Cited

OTHER PUBLICATIONS

Donald Sadoway: The missing link to renewable energy Youtube Video. https://www.youtube.com/watch?v=Sddb0Khx0yA. TED, Mar. 2012. Accessed Jun. 29, 2015.
Dworkin, et al. The Electrical Conductivity of Solutions of Metals in their Molten Halides. VIII. alkaline Earth Metal Systems. J. Phys. Chem. Jul. 1966; 70(7):2384.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
European search report and search opinion dated Feb. 12, 2014 for EP Application No. 13196841.4.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Jan. 24, 2012 for PCT Application No. US2010/002035.
International preliminary report on patentability and written opinion dated Feb. 17, 2009 for PCT Application No. US2007/018168.
International preliminary report on patentability and written opinion dated Mar. 26, 2013 for PCT Application No. US2011/052316.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Jun. 11, 2015 for PCT Application No. IB2014/002608.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Notice of allowance dated Jan. 6, 2015 for U.S. Appl. No. 13/237,215.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
Notice of allowance dated Jul. 13, 2012 for U.S. Appl. No. 11/839,413.

(56) References Cited

OTHER PUBLICATIONS

Notice of allowance dated Jul. 31, 2015 for U.S. Appl. No. 13/801,333.
Notice of allowance dated Aug. 2, 2012 for U.S. Appl. No. 12/505,937.
Notice of allowance dated Sep. 18, 2015 for U.S. Appl. No. 13/801,333.
Notice of allowance dated Dec. 11, 2015 for U.S. Appl. No. 13/801,333.
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
Office action dated Feb. 5, 2016 for U.S. Appl. No. 14/536,549.
Office action dated Mar. 14, 2014 for U.S. Appl. No. 13/237,215.
Office action dated Mar. 16, 2012 for U.S. Appl. No. 12/839,130.
Office action dated May 13, 2011 for U.S. Appl. No. 11/839,413.
Office action dated Jul. 31, 2015 for U.S. Appl. No. 14/210,051.
Office action dated Aug. 21, 2014 U.S. Appl. No. 12/839,130.
Office action dated Sep. 3, 2014 for U.S. Appl. No. 13/801,333.
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 24, 2015 for U.S. Appl. No. 14/045,967.
Office action dated Dec. 1, 2014 for U.S. Appl. No. 14/210,051.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of the Electrochemical Society. 2014; 161(12):A1898-A1904. Published Sep. 9, 2014.
Spatocco, et al. Low-Temperature Molten Salt Electrolytes for Membrane-Free Sodium Metal Batteries. Published Oct. 20, 2015, available at http://jes.ecsdl.org/content/162/14/A2729.fu Ii.pdf+html.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-071BS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 13/999,704, filed Mar. 14, 2014.
U.S. Appl. No. 14/210,051, filed Mar. 13, 2014.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 vol. 146, issue 1, 8-14.

(56) References Cited

OTHER PUBLICATIONS

European search report and search opinion dated May 6, 2016 for EP Application No. 13847926.
European search report and search opinion dated May 13, 2016 for EP Application No. 13846301.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
Office action dated Jun. 7, 2016 for U.S. Appl. No. 14/045,967.
Co-pending U.S. Appl. No. 15/136,337, filed Apr. 22, 2016.
Co-pending U.S. Appl. No. 15/628,538, filed Jun. 20, 2017.
Co-pending U.S. Appl. No. 15/647,468, filed Jul. 12, 2017.
Co-pending U.S. Appl. No. 15/690,863, filed Aug. 30, 2017.
Co-pending U.S. Appl. No. 15/836,038, filed Dec. 1, 2017.
"European Extended Search Report and opinion dated May 29, 2017 for EP Application No. 14857245."
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
International search report and written opinion dated Jun. 1, 2016 for PCT/US2016/019970.
International search report and written opinion dated Sep. 7, 2016 for PCT/US2016/021048.
Notice of allowance dated Apr. 11, 2017 for U.S. Appl. No. 14/688,214.
Notice of allowance dated Apr. 13, 2017 for U.S. Appl. No. 14/688,179.
"Notice of allowance dated May 11, 2017 for U.S. Appl. No. 14/688,214".
"Notice of allowance dated Jul. 17, 2017 for U.S. Appl. No. 14/688,214".
"Notice of allowance dated Jul. 28, 2017 for U.S. Appl. No. 14/688,214".
Notice of allowance dated Aug. 22, 2016 for U.S. Appl. No. 14/536,549.
"Notice of allowance dated Sep. 11, 2017 for U.S. Appl. No. 15/289,857".
"Notice of allowance dated Sep. 28, 2017 for U.S. Appl. No. 14/688,214".
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Mar. 22, 2017 for U.S. Appl. No. 14/536,563.
"Office action dated May 1, 2017 for U.S. Appl. No. 14/678,602.".
"Office action dated Jun. 15, 2017 for U.S. Appl. No. 14/687,838".
"Office action dated Sep. 5, 2017 for U.S. Appl. No. 15/140,434".
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Vassiliev, et al. A new proposal for the binary (Sn,Sb) phase diagram and its thermodynamic properties based on a new e.m.f study Journal of Alloys and Compounds 247 (1997) 223-233.
McAlister, A. J. The Al-Li (Aluminum-Lithium) System. Bulletin of Alloy Phase Diagrams, vol. 3, No. 2, 1982, pp. 177-178. doi: 10.1007/BF02892377.
Notice of allowance dated Jan. 11, 2018 for U.S. Appl. No. 15/136,337.
Notice of allowance dated Oct. 4, 2017 for U.S. Appl. No. 15/136,337.
Notice of allowance dated Dec. 20, 2017 for U.S. Appl. No. 15/136,337.
"Office action dated Mar. 27, 2018 for U.S. Appl. No. 15/140,434."
"Office action dated Apr. 20, 2018 for U.S. Appl. No. 15/057,732."
"Office action dated Jun. 7, 2018 for U.S. Appl. No. 14/687,838."
"Office action dated Jun. 25, 2018 for U.S. Appl. No. 15/063,842."
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
"Notice of allowance dated Aug. 31, 2018 for U.S. Appl. No. 15/057,732".
U.S. Appl. No. 15/130,129 Office Action dated Dec. 6, 2018.
U.S. Appl. No. 15/130,292 Office Action dated Nov. 19, 2018.

* cited by examiner

SYSTEMS AND METHODS FOR RECYCLING ELECTROCHEMICAL ENERGY STORAGE DEVICES

CROSS-REFERENCE

This application is a continuation of U.S. application Ser. No. 14/210,051, filed Mar. 13, 2014, now abandoned, which claims the benefit of U.S. Provisional Application No. 61/785,571, filed Mar. 14, 2013, each of which is entirely incorporated herein by reference.

BACKGROUND

A battery is a device capable of converting stored chemical energy into electrical energy. Batteries are used in many household and industrial applications. In some instances, batteries are rechargeable such that electrical energy is capable of being stored in the battery as chemical energy (i.e., by charging the battery).

SUMMARY

An electrochemical energy storage device (e.g., a liquid metal battery and/or electrochemical cell) can include a liquid electrolyte arranged between a negative liquid (e.g., molten) metal electrode and a positive liquid (e.g., molten) metal, metalloid and/or non-metal electrode. In some cases, the battery comprises an alkali metal such as lithium, sodium, potassium, rubidium, cesium, magnesium, barium, calcium, sodium and/or other materials. Suitable materials for the cathode can include lead, antimony, tin, tellurium, bismuth, zinc, cadmium, mercury, aluminum, gallium, indium, silicon, germanium, arsenic, selenium and/or other materials. The present disclosure recognizes and fulfills a need for methods for dismantling and/or recycling electrochemical energy storage devices (e.g., batteries), including liquid metal batteries.

The present disclosure provides systems and methods for recycling components of electrochemical energy storage devices. In some examples, following the useful life of an electrochemical energy storage device, individual components of the energy storage devices can be separated and stored for use in future energy storage devices.

An aspect of the present disclosure provides a method for recycling a battery, the method comprising: (a) providing a solidified energy storage device comprising an anode material and a cathode material separated by an electrolyte material, wherein the energy storage device has at least one opening; (b) melting at least one of the anode material, cathode material and electrolyte material to generate a material stream; and (c) collecting the material stream from the opening in a collection reservoir that is in fluid communication with the opening.

In some embodiments, the method further comprises sequentially melting a second one of the anode material, cathode material and electrolyte material to generate a second material stream and collecting the second material stream from the opening.

In some embodiments, sequentially melting at least any two of the anode material, cathode material and electrolyte material comprises melting the anode material at a temperature of at least about 64° C., 98° C., 180.5° C., 650° C., or 839° C.

In some embodiments, sequentially melting at least any two of the anode material, cathode material and electrolyte material comprises melting the cathode material at a temperature of at least about 327.5° C., 380° C., or between about 300 and 400° C.

In some embodiments, sequentially melting at least any two of the anode material, cathode material and electrolyte material comprises melting the electrolyte material at a temperature of at least about 450° C., or between about 400 and 700° C.

In some embodiments, sequentially melting at least any two of the anode material, cathode material and electrolyte material comprises melting the intermetallic material(s) at a temperature of between about 400 and 700° C., or between about 1000 and 1350° C.

In some embodiments, the melted material comprises an alkaline earth metal, an alkali metal, or any combination thereof.

In some embodiments, the at least one of the anode material, cathode material and electrolyte material are melted in an inert atmosphere.

In some embodiments, the inert atmosphere comprises argon and/or nitrogen.

In some embodiments, a plurality of electrochemical cells are recycled in a batch.

In some embodiments, the collection reservoir is dedicated for use with the anode material, cathode material, or electrolyte material.

In some embodiments, the method further comprises forming the at least one channel on a side of the solid mass prior to (a).

An aspect of the present disclosure provides a method for recycling a liquid metal battery, the method comprising: (a) providing an electrochemical cell in a cooled state, wherein the electrochemical cell operates in a heated state where at least one of a cathode and an anode are a liquid metal, and wherein the electrochemical cell comprises a channel formed on a side thereof; and (b) increasing the temperature of the electrochemical cell from the cooled state to a first temperature such that at least one of the anode, the cathode, an electrolyte, and a current collector melts and flows from the cell along the channel to a collection reservoir.

In some embodiments, the electrochemical cell comprises an alkali metal anode, and in (b) alkali metal from the anode is melted to flow along the channel to the collection reservoir.

In some embodiments, the method further comprises increasing the temperature of the electrochemical cell from the first temperature to a second temperature such that at least a second one of the anode, the cathode, the electrolyte, and the current collector melts and flows from the cell along the channel to the collection reservoir or another collection reservoir.

In some embodiments, the method further comprises increasing the temperature of the electrochemical cell from the second temperature to a third temperature such that at least a third one of the anode, the cathode, the electrolyte, and the current collector melts and flows from the cell along the channel to the collection reservoir or another collection reservoir.

In some embodiments, the electrochemical cell is among a plurality of electrochemical cells each having a channel formed on a side thereof, and wherein the electrochemical cells are stacked in a heating chamber and sequentially moved relative to a plurality of collection zones in the heating chamber where a different material among the anode, cathode, electrolyte, and current collector melts and is collected in each collection zone.

In some embodiments, the heating chamber comprises an inert atmosphere.

In some embodiments, the inert atmosphere comprises argon and/or nitrogen.

In some embodiments, the method further comprises removing trace amounts of reactive metal with water.

In some embodiments, the method further comprises forming the channel on the side of the electrochemical cell prior to increasing the temperature of the electrochemical cell.

In some embodiments the battery is a liquid metal battery.

In some embodiments the battery is an alkali metal battery.

In some embodiments the alkali metal is lithium, sodium, and/or potassium.

In some embodiments the battery is an alkaline earth metal battery.

In some embodiments the alkaline earth metal is magnesium or calcium.

In some embodiments the battery is a molten salt battery.

In some embodiments the molten salt is an alkali metal salt or an alkaline earth metal salt.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
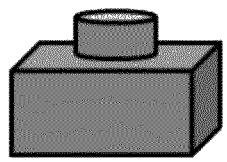
FIG. 1 is an illustration of an electrochemical cell and a compilation (i.e., battery) of electrochemical cells.
Figure 1:
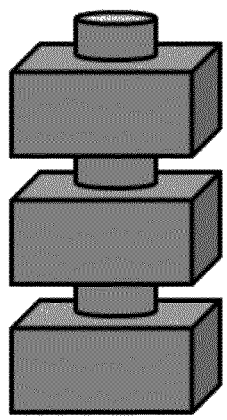
Figure 1:
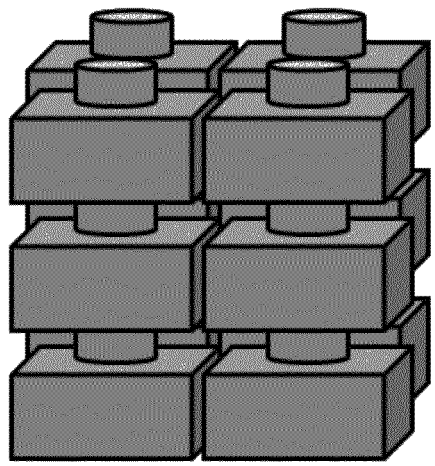

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

This disclosure provides electrochemical energy storage devices (e.g., batteries) and electrochemical battery housings. An electrochemical battery generally includes an electrochemical battery cell sealed (e.g., hermetically sealed) within an electrochemical battery housing.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically isolating seal.

The term "module," as used herein, generally refers to cells that are attached together in parallel by, for example, mechanically connecting the cell housing of one cell with the cell housing of an adjacent cell (e.g., cells that are connected together in an approximately horizontal packing plane). A module can include a plurality of cells in parallel. A module can comprise any number of cells (e.g., 2, 3, 4, 5, 6, 7, 8, 9, 10, 11, 12, 13, 14, 15, 16, 17, 18, 19, 20, or more). In some cases, a module comprises 4, 9, 12, or 16 cells. In some cases, a module is capable of storing about 1000 Watt-hours of energy and/or delivering about 500 Watts of power.

The term "pack," as used herein, generally refers to modules that are attached through different electrical connections (e.g., vertically and in series or parallel). A pack can comprise any number of modules (e.g., 1, 2, 3, 4, 5, 6, 7, 8, 9, 10, 11, 12, 13, 14, 15, 16, 17, 18, 19, 20, or more). In some cases, a pack comprises 6 modules. In some cases, a pack is capable of storing about 6.5 kilowatt-hours of energy and/or delivering about 3 kilowatts of power.

The term "core," as used herein generally refers to a plurality of modules or packs that are attached through different electrical connections (e.g., in series and/or parallel). A core can comprise any number of modules or packs (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more). In some cases, the core also comprises mechanical, electrical, and thermal systems that allow the core to efficiently store and return electrical energy in a controlled manner. In some cases, a core comprises 32 packs. In some cases, a core is capable of storing at least about 32 kilowatt-hours of energy. In some cases, a core is capable of storing about 200 kilowatt-hours of energy and/or delivering about 100 kilowatts of power.

The term "pod," as used herein, generally refers to a plurality of cores that are attached through different electrical connections (e.g., in series and/or parallel). A pod can comprise any number of cores (e.g., 1, 2, 3, 4, 5, 6, 7, 8, 9, 10, 11, 12, 13, 14, 15, 16, 17, 18, 19, 20, or more). In some cases, the pod contains cores that are connected in parallel with appropriate by-pass electronic circuitry, thus enabling a core to be disconnected while continuing to allow the other cores to store and return energy. In some cases, a pod comprises 2 cores. In some cases, a pod is capable of storing about 400 kilowatt-hours of energy and/or delivering about 200 kilowatts of power.

The term "system," as used herein, generally refers to a plurality of cores or pods that are attached through different electrical connections (e.g., in series and/or parallel). A system can comprise any number of cores or pods (e.g., 2, 3, 4, 5, 6, 7, 8, 9, 10, 11, 12, 13, 14, 15, 16, 17, 18, 19, 20, or more). In some cases, a system comprises 5 pods. In some cases, a system is capable of storing about 2 megawatt-hours of energy and/or delivering about 1000 kilowatts of power.

The term "battery," as used herein, generally refers to one or more electrochemical cells connected in series and/or parallel. A battery can comprise any number of electrochemical cells, modules, packs, cores, pods or systems.

The term "vertical," as used herein, generally refers to a direction that is parallel to the gravitational acceleration vector (g).

The term "cycle," as used herein, generally refers to a charge/discharge or discharge/charge cycle.

Electrochemical Energy Storage

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. In some examples, an electrochemical cell is a liquid metal battery cell, alkali metal or alkaline earth metal battery cell (e.g., sodium, lithium, potassium, magnesium, or calcium metal battery), molten salt battery (e.g., sodium sulfur, lithium sulfur), or any suitable electrochemical cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkali metal (e.g., lithium, magnesium, sodium) negative electrode, an electrolyte, and a molten metal positive electrode. The molten metal positive electrode can include one or more of tin, lead, bismuth, antimony, tellurium and selenium. Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid metal electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., tellurium and selenium), or combinations thereof. In some examples, the positive electrode can comprise a Group 12 element of the periodic table of the elements, such as one or more of zinc (Zn), cadmium (Cd) and mercury (Hg). The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte includes lithium chloride. As an alternative, the salt of the active alkali or alkaline earth metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., or at least about 700° C. In some situations, the battery cell is heated to between 200° C. and about 600° C., or between about 450° C. and 575° C.

Electrochemical cells of the disclosure may be adapted to cycle between charged (or energy storage) modes and discharged (or energy release) modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode can store electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode).

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Na, Li, Ca, Mg). During charging, the alloy at the positive electrode can disassociate to yield cations of the negative electrode material (e.g., $Na^+$, $Li^+$, $Ca^{2+}$, $Mg^{2+}$), which migrate into the electrolyte. The electrolyte can then provide cations (e.g., the cation of the negative electrode material) to the negative electrode, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Na^+$, $Li^+$, $Ca^{2+}$, $Mg^{2+}$), and the positive electrode comprises positive electrode material (e.g., Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material wets into a foam (or porous) structure of the negative current collector. Concurrently, positive electrode material from the positive electrode dissolves into the electrolyte as cations of the positive electrode material (e.g., $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell can contact and be electrically coupled with an endwall of the container. An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container. A battery, as used herein, can comprise a plurality of electrochemical cells. Individual cells of the plurality can be electrically coupled to one another in series and/or in parallel. In serial connectivity, the positive terminal of a first cell is connected to a negative terminal of a second cell. In parallel connectivity, the positive terminal of a first cell can be connected to a positive terminal of a second and/or additional cell(s).

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of electrochemical cells). The cells can be arranged in parallel, in series, or both in parallel and in series (C).

Electrochemical cells of the disclosure may be capable of storing and/or receiving input of ("taking in") substantially large amounts of energy. In some instances, a cell is capable of storing and/or taking in (i.e., having an energy storage capacity of) about 1 Watt-hour (Wh), about 5 Wh, 25 Wh, about 50 Wh, about 100 Wh, about 250 Wh, about 500 Wh, about 1 kilowatt-h (kWh), about 1.5 kWh, or about 2 kWh. In some instances, the battery is capable of storing and/or taking in at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. A cell can be capable of providing a current at a current density of at least about 10 $mA/cm^2$, 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$; where the current density is determined based on the effective cross-sectional area of the electrolyte and where the cross-sectional area is the area that is orthogonal to the net flow direction of ions through the electrolyte during charge or discharge processes.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (i.e., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a substantially large amount of energy for use with a power grid (i.e., a grid-scale battery) or other loads or uses. In some instances, a battery is capable of storing and/or taking in about 5 kWh, 25 kWh, about 50 kWh, about 100 kWh, about 500 kWh, about 1 megawatt-hour (MWh), about 1.5 MWh, about 2 MWh, about 3 MWh, about 5 MWh, about 10 MWh, about 25 MWh, about 50 MWh, or about 100 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance).

An electrochemical energy storage device can include one or more individual electrochemical cells. An electrochemical cell can be housed in a container, which can include a container lid (e.g., cell cap). The device can include at least 1, 2, 3, 4, 5, 6, 7, 8, 9, 10, 20, 30, 40, 50, 100, 200, 300, 400, 500, 1000, 10,000, 100,000, or 1,000,000 cells. The container lid may utilize, for example, a seal or sealant material component (e.g., annular dielectric ring) to electrically isolate the container from the container lid. Such a component may be constructed from anelectrically insulating material, such as, for example, glass, oxide, ceramics, nitride ceramics, chalcogenides, or a combination thereof (e.g., ceramic, silicon oxide, aluminum oxide, boron nitride, aluminum nitride, or other oxides comprising of lithium oxide, calcium oxide, barium oxide, yttrium oxide, silicon oxide, aluminum oxide, or lithium nitride). The seal or sealant material component may be made hermetic by one or more methods. For example, the seal may be subject to relatively high compressive forces (e.g., greater than 10,000 psi) between the container lid and the container in order to provide a seal in addition to electrical isolation. Alternatively, the seal may be bonded through a weld, a braze, or other physicochemically adhesive material that joins relevant cell components to the insulating sealant material.

Figure 2:
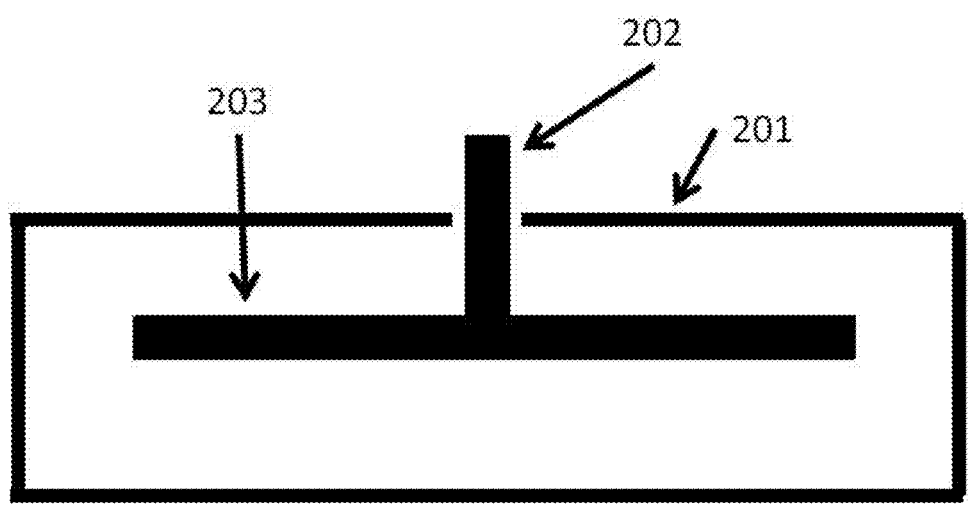
FIG. 2 is a schematic cross-sectional illustration of a housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, about 0.2, or about 0.3. In some cases, the ratio of the area of the aperture to the area of the housing is less than or equal to 0.001, less than or equal to 0.005, less than or equal to 0.01, less than or equal to 0.05, less than or equal to 0.1, less than or equal to 0.15, less than or equal to 0.2, or less than or equal to 0.3.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.3, 0.2, 0.15, 0.1, 0.05, 0.01, 0.005, or 0.001.

A cell housing can comprise an electrically conductive container and a conductor in electrical communication with a current collector. The conductor protrudes through the container through an aperture in the container and is electrically isolated from the container. The ratio of the area of the aperture to the area of the container may be less than about 0.3, 0.2, 0.15, 0.1, 0.05, 0.01, 0.005, or 0.001. The housing can be capable of enclosing a cell that is capable of storing and/or taking in less than 100 Wh of energy, about 100 Wh of energy, or more than 100 Wh of energy. The cell can be capable of storing and/or taking in at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
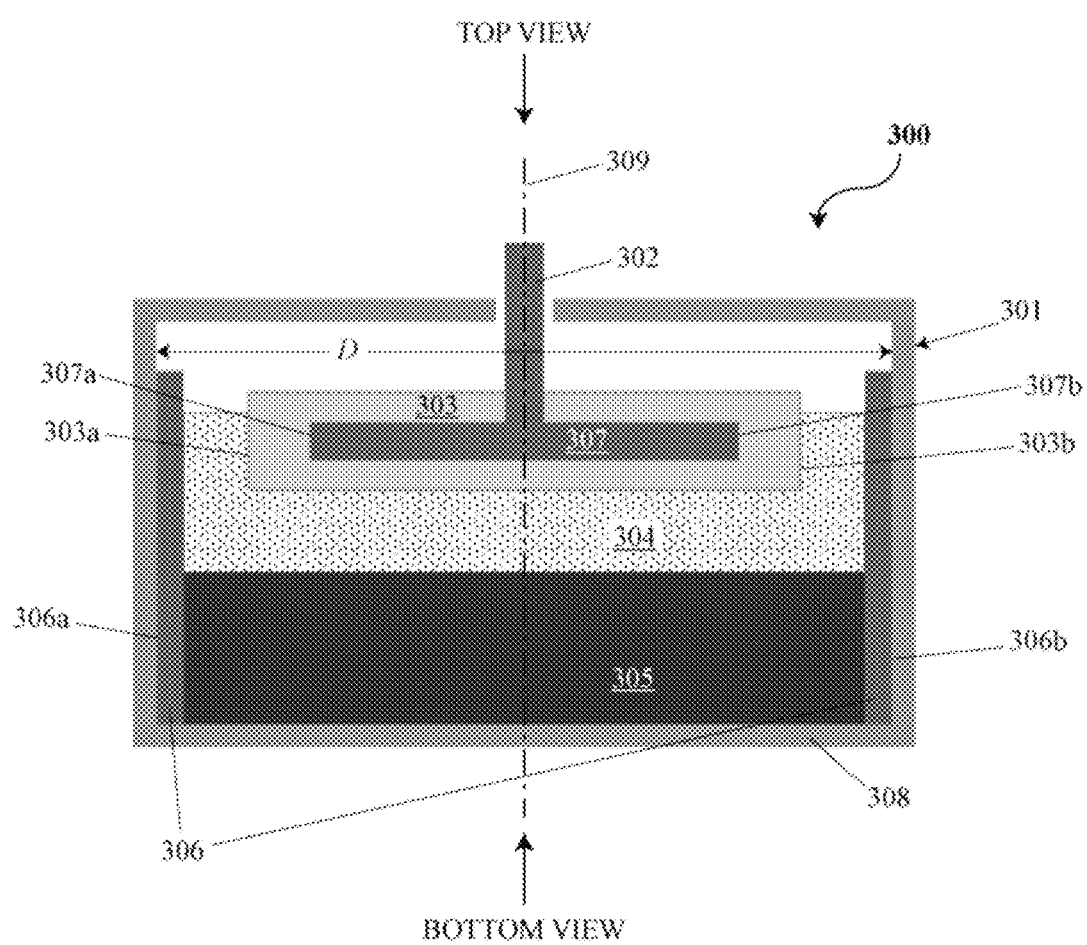
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid metal electrolyte (e.g., liquid salt electrolyte) 304 between the liquid metal electrodes 303, 305. The cell or battery 300 can be configured for use with cell chemistries operated in a low voltage mode ("Type 1 mode") or a high voltage mode ("Type 2 mode"), as disclosed elsewhere herein. The conductor 302 may be electrically isolated from the housing 301 (e.g., using electrically insulating seals). The negative current collector 307 may comprise a foam material that behaves like a sponge, and is "soaked" in negative electrode liquid metal (e.g., alkali or alkaline earth metal) 303. The negative liquid metal electrode 303 is in contact with the molten salt electrolyte 304. The electrolyte is also in contact with the positive liquid metal electrode 305. The positive liquid metal electrode 305 can be in electrical communication with the housing 301 along the side walls and/or along the bottom end wall of the housing.

The housing may include a container and a container lid (e.g., cell cap). The container and container lid may be connected mechanically. The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. As an alternative, the seal can be in the form of a gasket, for example, and placed between the container lid, and the container. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

The housing 301 can be constructed from an electrically conductive material such as, for example, steel, iron, stainless steel, graphite, nickel, nickel based alloys, titanium, aluminum, molybdenum, tungsten, conductive compounds such as nitrides, or a combination thereof (e.g., alloyed). The housing may also comprise a thinner lining component of a separate metal or compound, or a coating (e.g., an electrically insulating coating), such as, for example, a steel housing with a graphite lining, or a steel housing with a nitride coating (e.g., boron nitride, aluminum nitride) or a titanium coating. The coating can exhibit favorable properties and functions, including surfaces that are anti-wetting to the positive electrode liquid metal. In some cases, the lining (e.g., graphite lining) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

The housing 301 may include a thermally and/or electrically insulating sheath 306. In this configuration, the negative electrode 303 may extend laterally between the side walls of the housing 301 defined by the sheath without being electrically connected (i.e., shorted) to the positive electrode 305. Alternatively, the negative electrode 303 may extend laterally between a first negative electrode end 303a and a second negative electrode end 303b. When the sheath 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The sheath (and/or coating) 306 can be constructed from a thermally insulating, thermally conducting, and/or electrically insulating material such as, for example, carbide (e.g., SiC, TiC), nitride (e.g., BN), alumina, titania, silica, magnesia, boron nitride, or a mixed oxide comprising one or more of, for example, calcium oxide, aluminum oxide, silicon oxide, lithium oxide, magnesium oxide, etc. As shown in FIG. 3, the sheath 306 has an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the sheath can be used to prevent corrosion of the container and/or prevent wetting of the cathode or other materials up the side wall, and may be constructed out of an electronically conductive material, such as steel, stainless steel, tungsten, molybdenum, nickel, nickel based alloys, graphite, titanium, or titanium nitride. The sheath may be very thin and could be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (i.e. Pb, Sn, Bi) can be used to provide a strong electrical connection between the sheath/coating and the cell housing. This layer can allow for easier fabrication and assembly of the cell.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or equal to the diameter of the cavity defined by the housing 301. In some cases, the negative current collector 307 may have a collector diameter (or other characteristic dimension, illustrated in FIG. 3 as the distance from 307a to 307b) that is less than, equal to, or more than the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the battery housing. In some cases, the positive current collector may not be electrically connected to the housing. The present invention is not limited to any particular configurations of the negative and/or positive current collector configurations.

The negative electrode 303 can be contained within the negative current collector (e.g., foam) 307. In this configuration, the electrolyte layer comes up in contact with the bottom, sides and/or the top of the foam 307. The metal contained in the foam (i.e., the negative electrode material) can be held away from the sidewalls of the housing 301, such as, for example, by the absorption and retention of the liquid metal electrode in the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, or less than or equal to about 115%, less than or equal to about 125%, less than or equal to about 150%, less than or equal to about 175%, less than or equal to about 200%, less than or equal to about 250%, or less than or equal to about 300% of the average density of current flowing across the surface. In some examples, the minimum density of current flowing across an area of the surface is greater than or equal to about 50%, greater than or equal to about 60%, greater than or equal to about 70%, greater than or equal to about 80%, greater than or equal to about 90%, or greater than or equal to about 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be at least or equal to about 5%, about 10%, about 20%, about 30%, about 40%, about 50%, about 60%, about 70%, about 80%, about 90%, or about 95% of the volume of the battery (e.g., as defined by the outer-most housing of the battery, such as a shipping container). In some cases, the combined volume of anode and cathode material is at least about 5%, at least about 10%, at least about 20%, at least about 30%, at least about 40%, at least about 50%, at least about 60%, at least about 70%, or at least about 75% of the volume of the cell. The combined volume of the positive and negative electrodes material may increase or decrease (e.g., in height) during operation due to the growth or expansion, or shrinkage or contraction, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can comprise one or more alloyed products that are liquid, semi-liquid (or semi-solid), or solid. The alloyed products can be immiscible with the negative electrode, positive electrode and/or electrolyte. The alloyed products can form from electrochemical processes during charging or discharging of a cell.

An alloyed product can comprise an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode, or electrolyte, at a location (e.g., interface) between the negative electrode and the electrolyte or between the positive electrode and the electrolyte, or any combination thereof. In an example, an alloyed product is an intermetallic between the positive electrode and the electrolyte (see FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
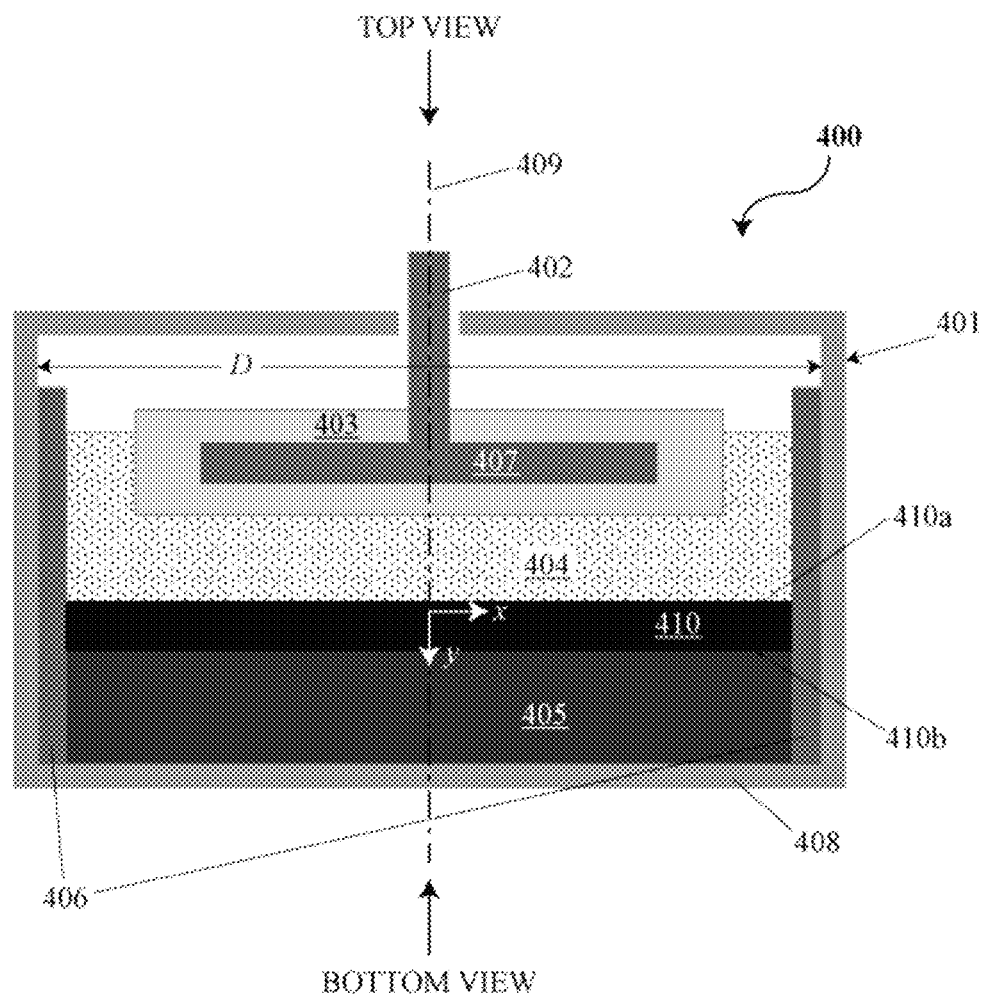
FIG. 4 is a cross-sectional side view of an electrochemical cell or battery with an intermetallic layer.

FIG. 4 is a cross-sectional side view of an electrochemical cell or battery 400 with an intermetallic layer 410. The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can comprise a thermally and/or electrically insulating sheath 406. The intermetallic layer 410 can comprise a mutual reaction compound of a material originating from the negative electrode 403 and positive electrode material 405. An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid metal electrolyte 404. The mutual reaction compound (or product) can be solid or semi-solid. The intermetallic layer 410 can form, for example, at the interface between the liquid metal cathode 405 and the liquid metal electrolyte 404. In some cases, the intermetallic layer 410 may exhibit liquid properties (e.g., the intermetallic may be semi-solid, or it may be of a higher viscosity or density than one or more adjacent phases/materials). For example, a negative liquid metal electrode 403 can comprise an alkali or alkaline earth metal (e.g., Na, Li or Mg), the positive liquid metal electrode 405 can comprise one or more of transition metal, d-block (e.g., Group 12), Group IIIA, IVA, VA or VIA elements (e.g., lead and/or antimony), and the intermetallic layer 410 can comprise a mutual reaction compound or product thereof (e.g., alkali plumbide or antimonide, e.g., $Na_3Pb$, $Li_3Sb$, or $Mg_3Sb_2$).

In an example, the negative liquid metal electrode 403 comprises magnesium (Mg), the positive liquid metal electrode 405 comprises antimony (Sb), and the intermetallic layer 410 comprises Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises an alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and 750° C. In a charged state, all or substantially all the components of the cell can be in a liquid state. Alternative chemistries exist, including, but not limited to, for example, Ca-Mg∥Bi cells comprising a calcium halide constituent in the electrolyte (e.g., $CaCl_2$, KCl, LiCl, or combinations thereof) and operating above about 500° C., Li∥Pb-Sb cells comprising a lithium halide electrolyte (e.g., LiF, LiCl, LiBr, or combinations thereof) and operating between about 350° C. and 550° C., and Na∥Pb cells comprising a sodium halide as part of the electrolyte (e.g., NaCl, NaF, LiCl, LiF, LiBr, KCl, KBr, or combinations thereof) and operating above about 300° C. In some cases, the product of the discharge reaction may be an intermetallic compound (e.g., $Mg_3Sb_2$ for the Mg∥Sb cell chemistry, $Li_3Sb$ for the Li∥Pb-Sb chemistry, or $Ca_3Bi_2$ for the Ca-Mg∥Bi chemistry), where the intermetallic layer may develop as a distinct solid phase.

Figure 5:
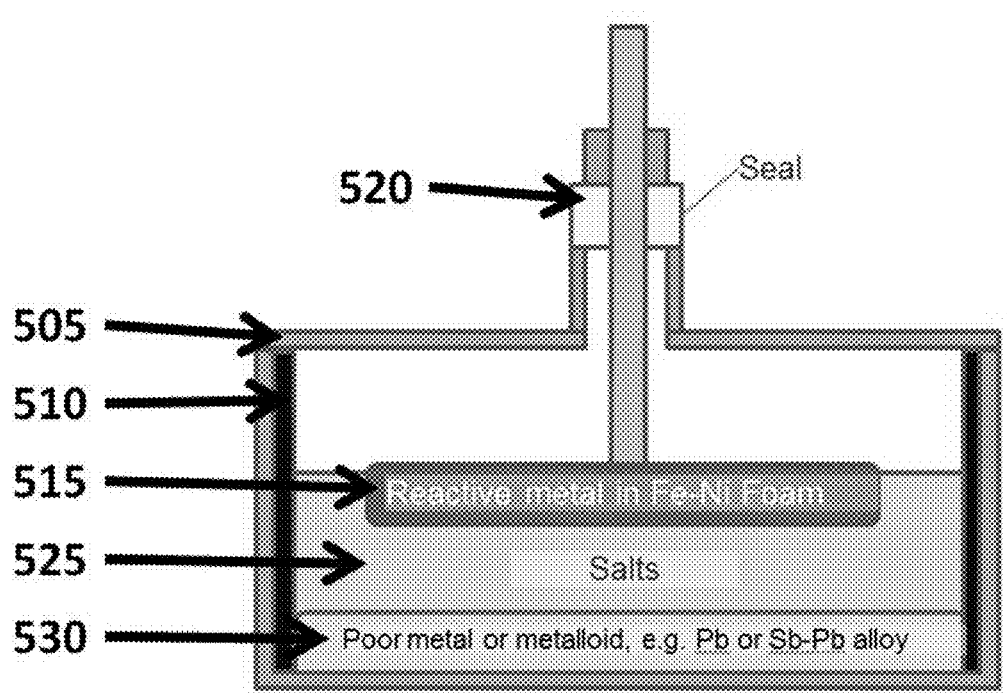
FIG. 5 is a cross-sectional side view of a liquid metal battery cell.

Another example of an electrochemical energy storage device 500 is shown in FIG. 5 in a discharged state. Here, a steel container 505 houses liquid metal electrodes. A graphite sheath 510 prevents the electrodes from coming into contact with the container walls. A current collector 515 has alkali metal (the anode) encapsulated in an iron-nickel (Fe—Ni) foam. The current collector passes through the housing and is electrically isolated therefrom by a glass and/or ceramic seal 520. In this case, a first liquid metal layer 525 comprises alkali metal salts (e.g., halide) as the electrolyte. A second metallic layer (e.g., intermetallic layer not shown) can comprise a compound having alkali metal and other metal elements. A third liquid layer 530 (cathode) comprises a poor metal or metalloid (e.g., lead, antimony, bismuth) in pure or alloyed form.

Disassembly and Recycling of Energy Storage Devices

Following their useful life, the electrochemical cells can be decommissioned. The useful life of the cell can be any period of time, including about 1 month, about 1 year, about 5 years, about 10 years, about 15 years, about 20 years, about 25, or about 30 years. In some cases, the useful life is at least 1 month, at least 1 year, at least 5 years, at least 10 years, at least 15 years, at least 20 years, at least 25, or at least 30 years. The electrochemical cells can also be decommissioned before the end of their useful life. For example, a cell may be suitably operational, but it might be more economical to disassemble the cell in the field rather than move the cell to a new location where it can be needed. The supply of electrochemical cells in one region may exceed the need in some cases, and some cells can be decommissioned before the end of their useful life.

In some cases, if the energy storage capacity of a cell is at or below a given value, then it can be determined that the cell is no longer suited for use in storing and/or delivering energy. The useful life of an electrochemical cell may be deemed to be spent if the cell has an energy storage capacity that is less than about 10 MWh, 5 MWh, 1 MWh, 1000 kWh, 100 kWh, 50 kWh, 40 kWh, 30 kWh, 20 kWh, 10 kWh, 5 kWh, 3 kWh, 2 kWh, 1 kWh, 500 Wh, 100 Wh, 50 Wh, 25 Wh, 5 Wh, or 1 Wh. As an alternative, or in addition to, the useful life of a cell may be deemed to be spent if a response time of the cell is greater than 1 ms, 10 ms, 50 ms, 100 ms, 500 ms, 1 s, or 10 s. As an additional alternative, the useful life of a cell may be deemed spent if the container, seal, or other "passive" or "non-active" component(s) of the cell are corroded or etched, or otherwise mechanically deformed to the point where functionality of the component(s) is compromised.

The cells can be disassembled in a safe and economical way. In some cases, the cells comprise a reactive metal. The reactive metal can be, but is not limited to, alkali metals (e.g., lithium, sodium, or potassium) or alkaline earth metals (e.g., magnesium, calcium), which can react readily and exothermically with water. The methods described herein recover the metal from the cells in a safe manner (without uncontrolled/explosive outputs of energy). In some instances, the metal and materials containing metals are further re-processed such that they can be disposed of safely and/or used in new electrochemical energy storage devices.

Some components of the electrochemical cell can be re-used or re-conditioned for re-use (e.g., the steel container). In some cases, valuable components are recovered from the electrochemical cell (e.g., an alkali metal). Safety measures may be implemented to avoid the risks of high temperatures or exposure to a reactive metal or other by-products of the recovery process (e.g., hydrogen). In some cases, the methods are performed in an inert environment (e.g., argon gas) so that the reactivity and/or flammability of the metal or other by-products (e.g., hydrogen) is avoided.

The electrochemical cells can be disassembled in a continuous process or a batch process. Batches of any number of cells can be processed including about 5 cells, about 10 cells, about 50 cells, about 100 cells, about 500 cells, about 1000 cells, or about 5000 cells. In some cases, at least 5 cells, at least 10 cells, at least 50 cells, at least 100 cells, at least 500 cells, at least 1000 cells, or at least 5000 cells are processed in a batch.

The cell and/or its components can be treated mechanically (e.g., by crushing, sawing, grinding, etc) at different points in the separation process to improve the effectiveness of any of the separation steps. For example, crushing into small particles can increase the surface area, which can lead to the reactive metal (e.g., alkali and/or alkaline earth metal) being more accessible for chemical removal.

Disassembly and Recycling of Energy Storage Devices by Melting

At the end of life, the cells may be decommissioned. One method to recover and recycle the cell's components is to utilize the difference in melting points of the cell's components in order to melt and separate them.

The cells can be vertically cut open to form an opening and/or channel, optionally stacked in a way that the cuts (e.g., channels) are aligned (e.g., vertically), and heated (e.g., in a closed, inert chamber comprising argon). As the temperature reaches the melting points of each component in the cell, the components will melt sequentially from the lowest to the highest melting point and drip out from the cuts (e.g., channels in the side of the housing). This allows separation of the cell constituents.

The cells can be disassembled based at least in part on the difference in the melting points of the components. Table 1 shows representative values of melting points of example cell components.

TABLE 1

Melting points of exemplary cell components

| Components | Sodium | Pb | Na-Halide salts | $Na_5Pb_2$ | Ni | Fe | Steel | Graphite |
|---|---|---|---|---|---|---|---|---|
| Melting Point (° C.) | 98 | 327.5 | 675 | ~400 | 1455 | 1538 | ~1500 | 3550 |

Figure 6:
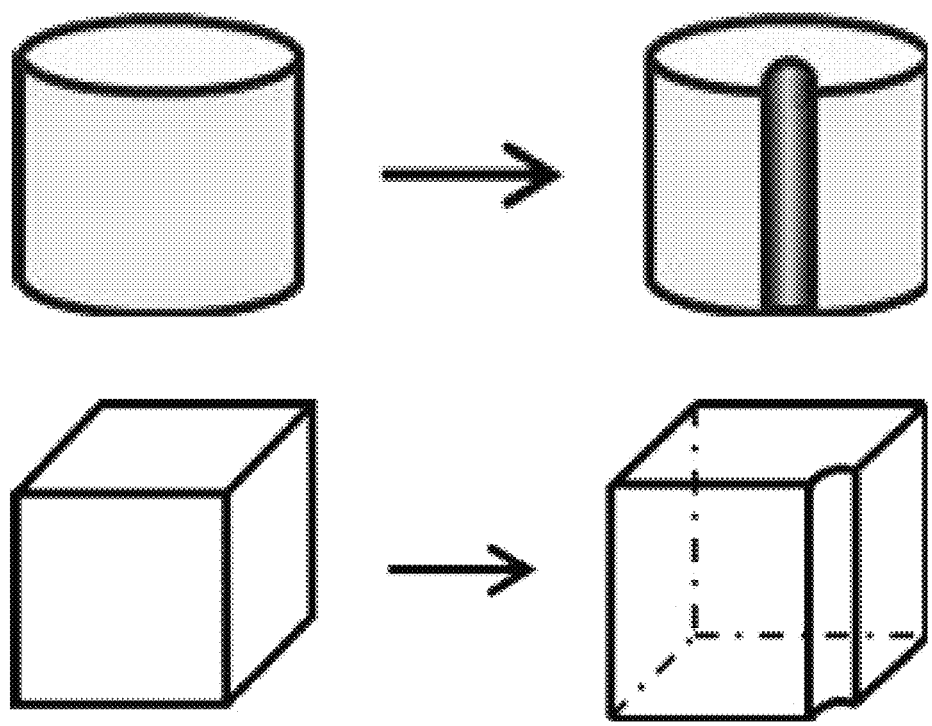
FIG. 6 is a drawing of cylindrical and cubic cells having a channel cut along their side.

The electrochemical cells can be any shape. In some cases, they are cylindrical or cuboidal. The cells can be cut along any part of the housing to form an opening from which molten material can flow. In some cases, the opening can be an elongated channel extending vertically from components on the bottom of the cell to components on the top of the cell. In some cases, the sides (cylindrical) or corners (cuboidal) of the cells are cut to expose the contents of the cell, such as displayed in FIG. 6. The cut will serve as a channel for the molten components to flow out from the steel casing. In some cases, the housing is not cut, but instead has a stopper, gate, or other piece that is removed to form an opening and/or channel.

Figure 7:
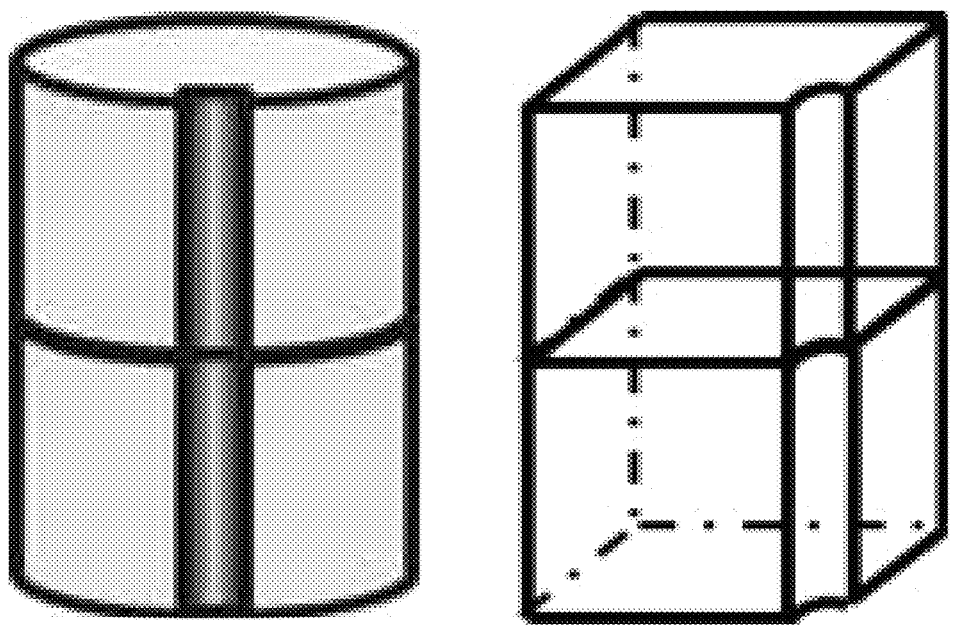
FIG. 7 is a drawing of cylindrical and cubic cells being stacked to align their channels.

In a configuration, the cells are stacked on top of one another, while aligning their cuts vertically, as seen in FIG. 7. In some examples, the channels are not aligned. In some examples, the parts of the cell that are cut open face downward (e.g., in a direction having a component parallel to the gravitational acceleration vector (g)).

The stacked cells can be loaded into a heating container (e.g., furnace). The container can be heated to a given temperature, or to a set of given temperatures. In some cases, the container can have one or more distinct temperature zones.

Figure 8:
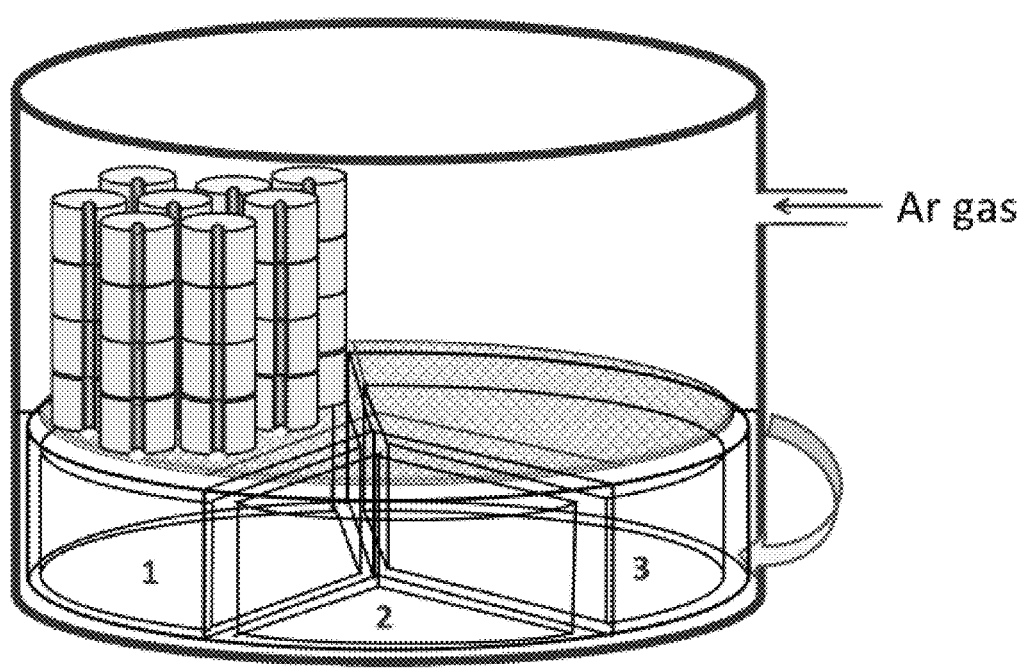
FIG. 8 is a drawing of a chamber suitable for melting and separating components of the electrochemical cells.

FIG. 8 shows an example of a configuration of such a container. In some cases, it consists of two chambers (e.g., top and bottom) that are separated by a grid or other surface through which molten material can flow. Either of the top or bottom chambers can be rotated. The bottom chamber is further divided into, for example, three compartments (numbered 1, 2, and 3 in FIG. 8), each of which holds one container or has a separate outlet for collecting molten material. The stacked cells rest on the grid that separates the top and bottom chamber. For each melting temperature, the cells are loaded only covering one of the bottom compartments such that the molten materials are separately collected.

The container can be flushed and/or flooded with argon gas to create an inert environment. The inert environment can prevent violent reactions involving reactive metals with fluid components such as oxygen and nitrogen. In some instances, one or more components are not fully removed. The components may stick to the inside of the cell walls for instance and require further tools or methods to be completely removed.

In an aspect, a method for recycling a liquid metal battery comprises: (a) providing a solidified energy storage device comprising an anode material and a cathode material separated by an electrolyte material, wherein the energy storage device has at least one opening; (b) melting at least one of the anode material, cathode material and electrolyte material to generate a material stream; and (c) collecting the material stream from the opening in a collection reservoir that is in fluid communication with the opening. In some cases, the method further comprises forming at least one channel on a side of the solid mass prior to (a). In some cases, the collection reservoir is dedicated for separate or individual use with the anode material, cathode material, or electrolyte material, respectively.

In some cases, the method further comprises sequentially melting a second one of the anode material, cathode material, electrolyte material, and intermetallic components to generate a second material stream and collecting the second material stream from the opening.

In some cases, sequentially melting at least any two of the anode material, cathode material, electrolyte material, and intermetallic components comprises melting the anode material at a temperature of at least about 100 to 200° C. In some instances, sequentially melting at least any two of the anode material, cathode material, electrolyte material, and intermetallic components comprises melting the cathode material at a temperature of at least about 300 to 450° C. In some embodiments, sequentially melting at least any two of the anode material, cathode material, electrolyte material, and intermetallic components comprises melting the electrolyte material at a temperature of at least about 400 to 500° C. In some embodiments, sequentially melting at least any two of the anode material, cathode material, electrolyte material, and intermetallic components comprises melting the intermetallic components at a temperature of about 300 to 400° C., about 400 to 500° C., about 500 to 600° C., about 600 to 700° C., about 700 to 800° C., or at least about 900 to 1000° C.

In some cases, the melted material comprises a metal (e.g., alkali metal such as sodium or alkaline earth metal such as magnesium). At least one of the anode material, cathode material and electrolyte material can be melted in an inert atmosphere (e.g., comprising argon, helium, neon, and/or nitrogen), or under vacuum. The vacuum can be provided with the aid of a pumping system comprising, for example, a mechanical pump.

In an aspect, a method for recycling a liquid metal battery comprises: (a) providing an electrochemical cell in a cooled state, wherein the electrochemical cell operates in a heated state where at least one of a cathode and an anode are a liquid metal, and wherein the electrochemical cell comprises a channel formed on a side thereof; and (b) increasing the temperature of the electrochemical cell from the cooled state to a first temperature such that at least one of the anode, the cathode, an electrolyte, and a current collector melts and flows from the cell along the channel to a collection reservoir. The first temperature can be elevated with respect to a temperature of the electrochemical cell at the cooled state.

In some cases, the electrochemical cell comprises a liquid metal anode, and in (b) liquid metal from the liquid metal anode is melted to flow along the channel to the collection reservoir.

In some cases, the method further comprises increasing the temperature of the electrochemical cell from the first temperature to a second temperature such that at least a second one of the anode, the cathode, the electrolyte, and the current collector melts and flows from the cell along the channel to the collection reservoir or another collection reservoir.

In some cases, the method further comprises increasing the temperature of the electrochemical cell from the second temperature to a third temperature such that at least a third one of the anode, the cathode, the electrolyte, and the current collector melts and flows from the cell along the channel to the collection reservoir or another collection reservoir.

The first, second, and third temperatures can be any suitable temperature (e.g., high enough to melt a component of the cell). In some cases, the first, second, or third temperatures are about 200° C., about 300° C., about 400° C., about 500° C., about 600° C., about 700° C., about 800° C., about 900° C., or about 1000° C. In some embodiments, the first, second, or third temperatures are at least about 200° C., at least about 300° C., at least about 400° C., at least about 500° C., at least about 600° C., at least about 700° C., at least about 800° C., at least about 900° C., or at least about 1000° C. In some embodiments, the first, second, or third temperatures are at most about 200° C., at most about 300° C., at most about 400° C., at most about 500° C., at most about 600° C., at most about 700° C., at most about 800° C., at most about 900° C., or at most about 1000° C.

In some cases, the electrochemical cell is among a plurality of electrochemical cells each having a channel formed on a side thereof. The electrochemical cells are stacked in a heating chamber and sequentially moved over a plurality of collection zones in the heating chamber where a different material among the anode, cathode, electrolyte, and current collector melts and is collected in each collection zone. In some cases, the method further comprises forming the channel on the side of the electrochemical cell prior to increasing the temperature of the electrochemical cell.

In some cases, the heating chamber comprises an inert atmosphere (e.g., comprising argon). In some cases, the method further comprises removing trace amounts of reactive metal with water.

Disassembly and Recycling of Energy Storage Devices by Aqueous Treatment

Another method to recover and recycle the components of electrochemical cells (e.g., at the end of life) is with the aid of aqueous treatment of the cells or cell components. Some metals such as, for example, lithium, sodium, and calcium react strongly with water, sometimes resulting in uncontrolled releases of energy and/or fire, as well as reactive or hazardous gaseous components such as hydrogen. In some cases, the electrochemical cells contain reactive metal. The amount of reactive metal in the cells can be reduced from the amount used in operation of the cell by, for example, melting and collecting components comprising the metal. In some cases, some metal remains and can be removed by aqueous treatment as described herein.

Described herein are multiple methods for removal of reactive metals from energy storage devices by aqueous treatment. The reactive metals can be removed by contacting the device with water directly (e.g., by controlling the rate at which the device is immersed in water). The reactive metals can be removed by contacting the device with a mixture or solution having a dilute amount of water (e.g., water in iso-butanol). The reactive metals can be removed by contacting the device with a solution of water and a hydroxide salt (e.g., water and lithium hydroxide when dissolving lithium, or water and sodium hydroxide when dissolving sodium). The reactive metals can be removed by contact with superheated steam. The methods can be performed in any order or combined with other methods to yield yet more methods.

The methods can be performed in a safe manner. In some cases, the reactive metal (or metals) is removed such that there is no explosion or fire (e.g., removed slowly, in an argon environment, in a closed container, etc.). In some examples, hydrogen gas is generated. The hydrogen gas can be released at a safe concentration such that it does not explode. In some examples, stibine (e.g., $SbH_3$) gas is generated, which can be highly toxic. The stibine gas can be oxidized with oxygen gas to remove its presence. To facilitate the conversion of stibine gas into water and antimony in the presence of oxygen, the gas stream containing stibine can be passed through a carbon filter (e.g., comprising carbon powder or activated charcoal) to catalyze the conversion (e.g., decomposition reaction), and to prevent stibine gas from being exhausted to the environment (or decrease the amount of stibine gas exhausted to the environment).

The treated pieces can have any suitable amount of reactive metal (e.g., such that the risk of explosion or fire is negligible). In some embodiments, about 80%, about 90%, about 95%, about 99%, about 99.5%, about 99.9%, or about 99.99% of the reactive metal is removed. In some embodiments, at least about 80%, at least about 90%, at least about 95%, at least about 99%, at least about 99.5%, at least about 99.9%, or at least about 99.99% of the reactive metal is removed.

In some cases, the reactive metal is directly reduced by water. The reaction can be performed in an inert gaseous atmosphere (e.g., argon). The cell can be cut open and/or into multiple pieces and optionally further broken down mechanically by any suitable method.

The device or pieces thereof are immersed in water directly, contained in an inert (e.g., Ar or $N_2$) atmosphere. In an example where the reactive metal is sodium, one or more of the following reactions may occur:

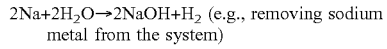
$2Na+2H_2O \rightarrow 2NaOH+H_2$ (e.g., removing sodium metal from the system)

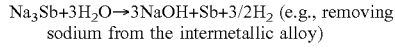
$Na_3Sb+3H_2O \rightarrow 3NaOH+Sb+3/2H_2$ (e.g., removing sodium from the intermetallic alloy)

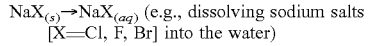
$NaX_{(s)} \rightarrow NaX_{(aq)}$ (e.g., dissolving sodium salts [X=Cl, F, Br] into the water)

Possible side reactions may also occur, potentially resulting in $X_2$ gases, $H_2$ gas, or stibine. Output gases can be ventilated out for further treatment, recycling, and/or disposal.

To control the rate of reaction, the cell pieces can be submerged at a slow and/or variable rate into the water (e.g., slower submerging resulting in lower rate of reaction). This can be done by, for example, mechanically lowering a porous basket of cell pieces into liquid water.

After reactive metal reactions have occurred (e.g., as indicated by the absence of bubbling gas production, or by the subsiding of temperature increases, measured with appropriate sensors), the solid pieces can be removed (e.g., for drying in a ventilated facility). In some cases, the pieces are sent for further treatment, recycling, and/or disposal. The waste water may contain NaOH, NaX, and possible trace Sb, Pb, C, and/or Fe compounds, which can be sent for further treatment, separation, and/or disposal.

In an aspect, a method for removing reactive metal from a battery comprising an electrochemical cell comprises: (a) cutting the housing of the electrochemical cell to provide fluid access to the interior of the electrochemical cell; and (b) immersing the electrochemical cell in water at a rate such that the reaction between the water and reactive metal does not produce an uncontrollable release of energy. In some cases, the rate of immersion is proportional to the rate of gas production.

In an aspect, the reactive metal can be removed by contacting with superheated steam. Superheated steam process can be a safe and controlled way of reacting reactive metal off the cell. The process utilizes steam at elevated temperature (e.g., suitably high to keep the reactive metal(s) in a molten state during the course of the process) and slightly positive pressures (e.g., 5 inches of water column) for hydrolysis of the reactive metal. The process can be conducted in a closed vessel (e.g., to enhance safety), and can be well-controlled because the steam flow rate can be monitored and changed relatively easily. This process can remove reactive metal and its compounds completely because the density of reactive metal hydroxide (e.g., metal hydroxide formed from or comprising the reactive metal, wherein the metal hydroxide itself may or may not be reactive) produced can be significantly higher than the reactive metal (e.g., sodium), so the hydroxide will settle below the reactive metal, thus continually exposing fresh surface for the reaction.

The superheated steam method can include cutting or mechanically crushing the electrochemical storage device (e.g., into several pieces) and loading the pieces of the device into a tank or other vessel where reactions can occur. The vessel can be flushed with argon (or other appropriate) gas to create an inert environment. The system can be heated up to just above the melting point of the reactive metal (e.g., 98° C. for sodium) to keep it molten. Dry steam is injected into the tank and reactive metal-water vapor reaction begins. In an example where the reactive metal is sodium, the metal can react with the water vapor according to the reaction:

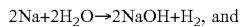
$2Na+2H_2O \rightarrow 2NaOH+H_2$, and

$Na_3Sb+3H_2O \rightarrow 3NaOH+Sb+3/2H_2$ $Na_3Sb$ can also react with water vapor to form small amounts of stibine, a toxic gas. However, stibine is unstable and decomposes to form metallic antimony, sodium by-products, and hydrogen gas.

Hydrogen gas generated from the reaction and can be vented out to another container and treated (e.g., through controlled burning) before it is released to the open air. The reactive metal hydroxide solution produced can stay in the tank until reaction is complete, or can be removed.

Once the reaction reaches completion (e.g., denoted by hydrogen gas attainment in the vent gas reaching any suitably low level, such as, for example, about 5%, 3%, 1%, 0.1%, 0.01%, or less), a steam flush can be started to assure completion. Reactive metal hydroxide (e.g., NaOH if the reactive metal is sodium) solution can then be pumped or otherwise directed out of the tank.

The cells in the tank can be flushed with water afterwards while still maintaining argon flow for decontamination of the reactive metal hydroxide. The steel casing, graphite sheath, Fe/Ni foam, and Pb/Sb alloy can stay in the tank or be removed from the tank and separated further.

In an aspect, a method for removing reactive metal from a battery comprising an electrochemical cell comprises: (a) cutting the housing of the electrochemical cell to allow fluids to access an interior of the electrochemical cell; (b) immersing the electrochemical cell with the cut housing in an inert environment; (c) heating the cell to a temperature greater than the melting point of the reactive metal; (d) injecting steam into the electrochemical cell such that the reactive metal reacts with the steam to form a reactive metal hydroxide solution and hydrogen gas; (e) removing the hydrogen gas from the inert environment; (f) removing the reactive metal hydroxide solution upon determining that the rate of production of hydrogen gas has slowed or stopped; and (g) rinsing the electrochemical cell with water. In some cases, the method further comprises recovering reactive metal from the reactive metal hydroxide solution.

Figure 9:
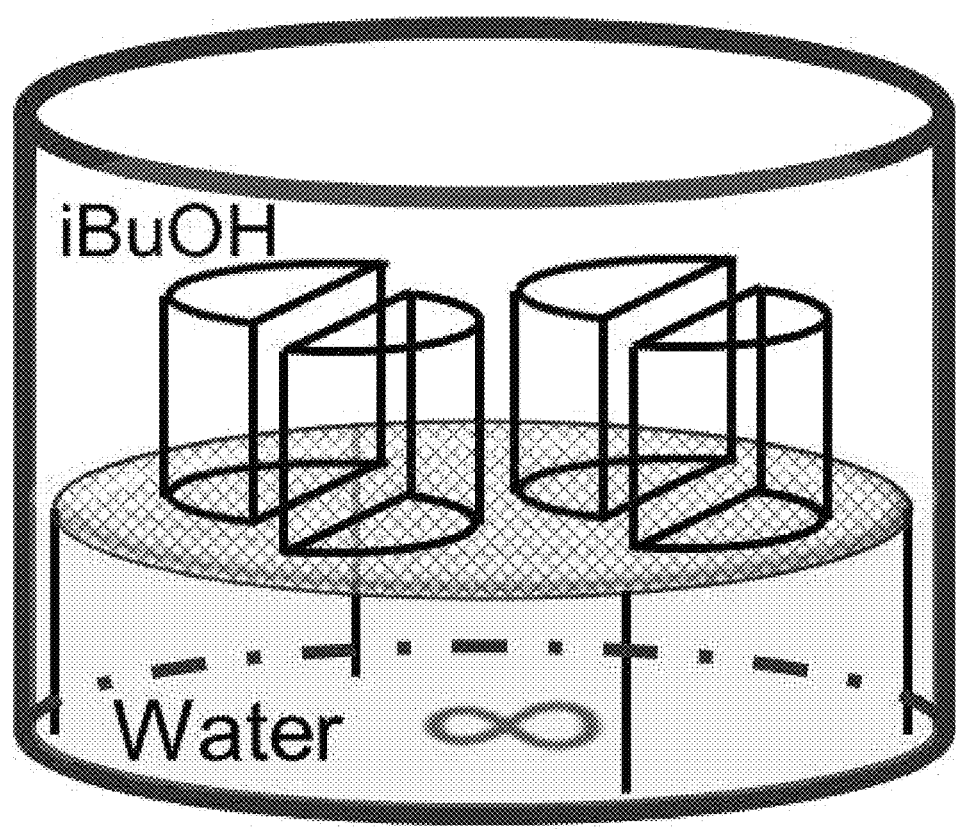
FIG. 9 is a drawing of a chamber suitable for performing aqueous removal of sodium from an electrochemical cell.

In some instances, removal of reactive metal salts such as, for example, Li, $Li_3Sb$, and Li-halide salts, is performed with an isobutylalcohol (iBuOH)/water biphasic system as shown in FIG. 9. The isobutylalcohol/water system is based on iBuOH and water's relative immiscibility and the low solubility of water in the iBuOH that allows a mild oxidation reaction to take place in the alcohol phase.

In some implementations, the reactive metal and/or a compound comprising the reactive metal (e.g., intermetallic alloy) can be contacted with water and/or steam comprising a hydroxide salt. In some cases, the hydroxide salt can be the same hydroxide salt as is formed when the reactive metal and/or the compound comprising the reactive metal react with water and/or steam to form a metal hydroxide solution and hydrogen gas. The hydroxide salt can be a metal hydroxide comprising an active alkali or alkaline earth metal of the electrochemical cell. Thus, specific metal hydroxides can be used for disassembly of cells with specific anode chemistries. For example, a $LiOH/H_2O_{liq\ or\ gas}$ solution can be used for cells with lithium chemistry, a $NaOH/H_2O_{liq\ or\ gas}$ solution can be used for cells with sodium chemistry, a $KOH/H_2O_{liq\ or\ gas}$ solution can be used for cells with potassium chemistry, $Mg/H_2O_{liq\ or\ gas}$ can be used for cells with magnesium chemistry, etc. In some cases, a solution comprising a mixture of hydroxide salts can be used. For example, a solution comprising a mixture of hydroxide salts can be used for cells comprising one or more active metals. Contacting or immersing the reactive metal and/or the compound comprising the reactive metal in its respective hydroxide can allow the reaction between the water/steam and the reactive metal to proceed without producing an uncontrollable release of energy. In some cases, contacting or immersing the reactive metal and/or the compound comprising the reactive metal in a solution comprising its respective hydroxide can result in a milder oxidation reaction of the reactive metal and/or the compound comprising the reactive metal (e.g., by shifting the equilibrium of the oxidation reaction toward the reactants) compared to a situation where pure water/steam is used. The hydroxide-water solutions can be partially saturated. For example, the hydroxide-water solutions can be at least about at least about 20%, at least about 40%, at least about 60%, at least about 80%, at least about 90% or at least about 95% saturated.

In an example, an aqueous recycling process involving mechanically separating the cell (e.g., cutting the cell into parts of pieces) is used. In some cases, the cell part(s) or piece(s) are cleaned of cutting oil(s). In some cases, the cell parts can be submerged in a hydroxide solution (e.g., a partially saturated aqueous hydroxide solution, such as, for example, a LiOH aqueous solution). In some cases, carbon dioxide gas can be bubbled through the hydroxide solution to precipitate out one or more carbonates from the hydroxide solution.

In some cases, the reactive metal is directly reduced by a water and/or steam solution. The reaction can be performed in an inert gaseous atmosphere (e.g., argon). The cell can be cut open and/or into multiple pieces and optionally further broken down mechanically by any suitable method. For example, the cells can be cut in half. In an example, the cut cells comprising lithium in various forms can be immersed in a partially saturated LiOH/water solution, which allows reaction of the cell components to proceed in a more controlled manner (e.g., less vigorously or less violently) than when the cell is immersed in pure water. In some implementations, the cell may not be cut open or mechanically broken down to allow for aqueous treatment to be performed; instead, one or more openings can be made into the cell to allow for water (e.g., pure or a solution) to enter the inside of the cell while allowing adequate room for reaction product(s) of the oxidation reaction (e.g., hydrogen gas) to exit the perforated cell. For example, the perforated cell can be leached with water, resulting hydrogen gas can be vented from the cell, and the metal hydroxide solution can be collected. In some cases, the metal hydroxide can be collected for subsequent recovery of the reactive metal from the metal hydroxide solution. For example, the metal hydroxide can be precipitated out of solution for subsequent recovery of the reactive metal from the metal hydroxide solution. In some cases, the stibine gas can be removed from the exit gas stream by passing it through a filter comprising an oxidizing agent, such as, for example, lead dioxide or hydroquinone(s). The oxidizing agent can aid or affect conversion of the stibine to antimony and water (e.g., by resulting in the reduction of hydrogen in the stibine gas to produce antimony and water). In some examples, the filter can further comprise one or more additional agents, or be used in combination with one or more additional filters (e.g., filters of different types).

In some cases, the metal hydroxide solution can be further reacted with other chemicals, such as, for example, carbon dioxide ($CO_2$) or calcium carbonate ($CaCO_3$), producing a carbonate which can be precipitated from the solution and sold to consumers of the carbonate compound. For example, an aqueous solution comprising lithium hydroxide (LiOH) can be reacted with carbon dioxide gas (e.g., by bubbling the gas through the solution), resulting in the production of water and lithium carbonate ($Li_2CO_3$), which can precipitate out of the solution and be mechanically separated from the solution and dried. In some cases, the hydroxide solution can be purified (e.g., via solvent extraction, by precipitating out one or more components, etc.) in one or more steps (e.g., leaving a residue comprising an unwanted component, slag, etc.). In some cases, the hydroxide solution can be directly heated (e.g., in a crystallizer) and/or dried to provide a hydroxide salt product. In some cases, the hydroxide solution can be otherwise transformed (e.g., reacted with one or more other compounds, such as, for example, hydrochloric acid).

In an aspect, a method for recycling a liquid metal battery comprises (a) providing an electrochemical cell comprising an anode, a cathode and an electrolyte between the anode and cathode, wherein the anode and/or the cathode comprises a reactive metal; (b) bringing the reactive metal in contact with water; and (c) with the aid of the water in (b), controllably removing the reactive metal from the electrochemical cell. In some cases, the electrochemical cell is cut to allow water to come in contact with the reactive metal. In some cases, the method further comprises rinsing the electrochemical cell with water upon removing the reactive metal from the electrochemical cell.

In some cases, operation (b) comprises contacting reactive metal with a mixture comprising iso-butyl alcohol and water. In some cases, operation (b) comprises contacting reactive metal with a mixture comprising a hydroxide salt and water. In some cases, (b) comprises bringing reactive metal in contact with superheated steam. In some cases, (b) further comprises melting the reactive metal and bringing the melted reactive metal in contact with the superheated steam.

In some cases, operation (b) comprises contacting reactive metal with a mixture comprising a hydroxide salt and water. In some cases, the hydroxide salt can be a hydroxide salt of the reactive metal (e.g., a hydroxide salt formed when the reactive metal reacts with water and/or steam to form a reactive metal hydroxide solution and hydrogen gas). In some cases, (b) comprises bringing reactive metal in contact with superheated steam. In some cases, (b) further comprises melting the reactive metal and bringing the melted reactive metal in contact with the superheated steam.

The superheated steam can have any pressure or temperature. In some cases, the steam has a pressure of at least about 0.1 pounds per square inch (psi), at least about 1 psi, at least about 10 psi, at least about 50 psi, at least about 100 psi, at least about 500 psi, at least about 1000 psi, at least about 1500 psi, at least about 2000 psi, at least about 2500 psi, or at least about 3000 psi. The pressure can be relative to atmospheric pressure.

In some cases, the reactive metal is reacted with water to form reactive metal hydroxide (e.g., NaOH) and hydrogen gas. The reactive metal hydroxide (e.g., sodium hydroxide) is reacted with carbon dioxide to form a reactive metal carbonate (e.g., sodium carbonate) and water, and the reactive metal carbonate (e.g., sodium carbonate) is collected.

In some cases, at least some of the sodium is $Na_3Sb$. The $Na_3Sb$ reacts with water to form stibine, which stibine subsequently decomposes to form antimony and hydrogen gas. In some examples, other reactive metal compounds comprising antimony can react with water to form stibine, and the stibine can subsequently decompose to form antimony and hydrogen gas.

In some cases, the reactive metal has been prior removed by melting the reactive metal and subsequently removing the melted reactive metal from the electrochemical cell. In some cases, at least about 50%, at least about 80%, or at least about 90% of the reactive metal has been removed from the electrochemical cell prior to reacting or dissolving the reactive metal with water.

An aspect of the disclosure is directed to an aqueous recycling process. The aqueous recycling process can be used in a method for recycling a battery, comprising (a) providing an electrochemical cell of the battery; (b) providing an aqueous hydroxide solution; (c) providing the aqueous hydroxide solution with fluid access to an interior portion of the electrochemical cell; and (d) contacting the interior portion of the electrochemical cell with the aqueous hydroxide solution. In some cases, providing fluid access further comprises mechanically separating the electrochemical cell. The electrochemical cell can be mechanically separated by cutting the electrochemical cell into pieces, along a side, to form an opening, or any combination thereof. In some cases, the method further comprises cutting a housing of the electrochemical cell. In some cases, the method further comprises cleaning at least a portion or piece of the electrochemical cell of cutting oil(s). In some cases, the method further comprises submerging the pieces in the aqueous hydroxide solution.

The electrochemical cell can comprise an anode, a cathode and an electrolyte between the anode and cathode. The anode and/or the cathode can comprise a reactive metal. The aqueous hydroxide solution can be partially saturated. In some cases, the aqueous hydroxide solution comprises a hydroxide salt comprising the reactive metal. For example, the aqueous hydroxide solution can comprise lithium hydroxide.

In some cases, the method further comprises removing the reactive metal from the electrochemical cell with the aid of the aqueous hydroxide solution. In some cases, the method further comprises increasing a concentration of the hydroxide salt in the aqueous hydroxide solution as a result contacting the interior portion of the electrochemical cell with the aqueous hydroxide solution.

In some implementations, the method can include contacting the aqueous hydroxide solution with a compound comprising carbon and oxygen. For example, the compound can be carbon dioxide gas, and the method can include bubbling the carbon dioxide gas through the aqueous hydroxide solution. The method can further comprise precipitating out a carbonate compound from the aqueous hydroxide solution. In some cases, the aqueous hydroxide solution comprises a hydroxide salt of a metal, and the carbonate compound comprises a carbonate salt of the same metal.

EXAMPLES

Example 1—Disassembly and Recycling by Melting

In this example, a plurality of electrochemical cells are cut along a vertical axis and stacked in a chamber as depicted in FIG. 8. The system is heated to greater than 327.5° C. where the lead (Pb) melts and drips into container labeled 1. After the bulk Pb has melted away, the bottom chamber is rotated 120° clockwise so that the cells rest on top of container labeled 2. The system is then heated to greater than about 350 to 650° C. where sodium-lead intermetallic compounds (e.g., $Na_5Pb_2$) melt into container 2. After the intermetallic compounds have melted, the bottom chamber is again rotated 120° clockwise so that the cells now rest on top of container labeled 3. The system is then heated to at least about 675° C. where the halide salts melt into container 3. Alternative combinations of anode, electrolyte, intermetallic and cathode materials will have different individual melting points, where the aforementioned steps might be sequenced differently, at different temperatures (e.g., an alternative cathode metal or alloy melts first into container 1 at 380° C., then an alternative salt electrolyte material melts second into container 2 at 450° C., then alternative intermetallic(s) with a high melting point are melted off last into container 3 at around or above 1000° C.)

The stainless steel casing, graphite sheath, and iron-nickel foam stay on top of the grid and are separated mechanically. The system is cooled to room temperature and all the components are now separated. The separated components can then be disposed of safely or further processed for purification and/or recycling.

Example 2—Process Scaling and Automation of Disassembly and Recycling

Conveyor belts move cells from step to step in the process, e.g., from a cell cutting station to an aqueous or steam treatment station, then to a station for mechanically crushing and breaking away one or more remaining components of the cell (e.g., to remove the graphite sheath, Fe/Ni foam, and/or Pb/Sb alloy from the steel casing for further separation). Each station in the process performs a specific function with automated (robotic-type) machinery, with appropriate sensors, control and automation equipment.

In one implementation, in a cutting station, machinery receives cells from a conveyor belt, aligns cells together such that a saw automatically cuts (several) cells open, then expunges the cells onto another conveyor belt that moves the open cells to the next station. In an aqueous treatment station, open cells are received from a conveyor belt, immersed into a water bath (e.g., pure water, iBuOH/water, or partially saturated hydroxide solution), and left to allow the reaction to proceed (e.g., to completion or until one or more reaction products, such as hydrogen gas, are no longer produced in a substantial or detectable amount) before moving the cells to the next (mechanical separation) station. In a mechanical separation station, a high impact force is applied (e.g., with a hammer, a crushing machine, or hammer-like devices) to the cell, causing the contents of the cell container to break, fall out, and separate from the container. A sieve and/or shaker device (or other separation machinery) is used to separate away the crumbled and broken pieces, leaving the remainder of the cell container for non-hazardous disposal and/or recycling. In some cases, one or more container pieces that are separated away can be further processed for treatment, recycling, and/or disposal. For example, prior to, after, or instead of processing in a mechanical separation station, the cells can be received at a melting station, where remaining cell components are melted to recover other metals.

In another implementation, conveyor belts move cells from a cell cutting station where cells are cut open to form an opening and/or channel to a melting station, and then to a station for mechanically crushing and breaking away one or more remaining components of the cell (e.g., to remove the graphite sheath and iron-nickel foam from the steel casing for further separation).

In some cases, cells that undergo melting are further processed in a purification and cleaning station, where aqueous or other chemical processes are performed (e.g., with spraying or soaking) to remove residual or trace reactive metal (e.g., sodium, lithium, magnesium) components from the remainder of the cell container and/or reactive metal containing components. The waste stream(s) can then go through other processes for further treatment, recycling, and/or disposal.

Example 3—Disassembly and Recycling by Aqueous Treatment

Figure 10:
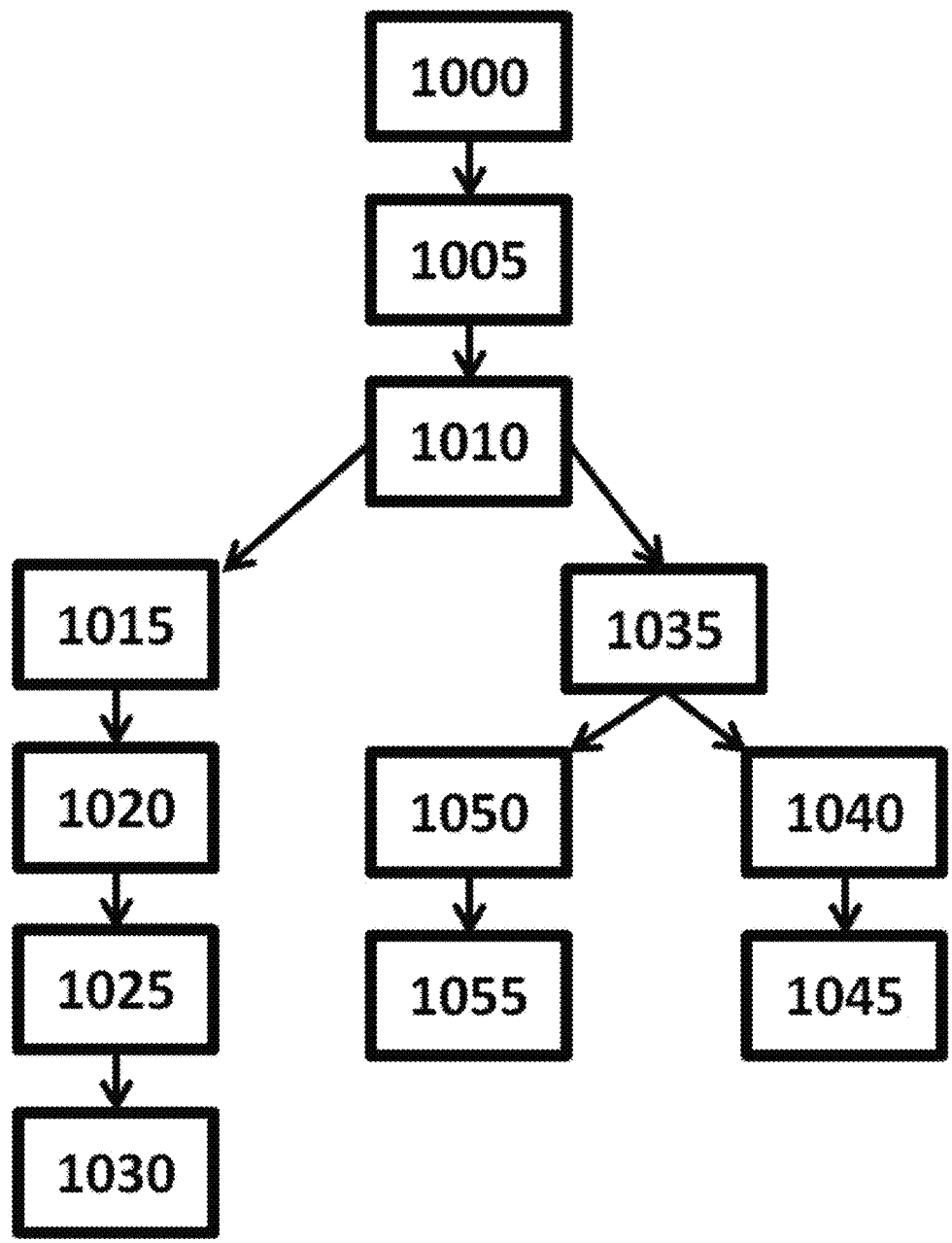
FIG. 10 is a flow chart of a method for recycling an electrochemical storage device.

For liquid metal batteries, the steps for sodium (or other reactive metal) separation are summarized in FIG. 10 and described here. The decommissioned cell 1000 is cut into (e.g., several) pieces to expose the contents for treatment 1005. The cell is loaded into a vessel containing water and iBuOH two phase system that are separated by a grid 1010, as shown in FIG. 9. Water molecules present in the alcohol phase react with sodium to produce sodium hydroxide and hydrogen gas according to reaction:

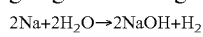

Hydrogen gas is slowly released to the air, while sodium hydroxide is soluble in the water phase. Carbon dioxide ($CO_2$) gas is bubbled 1015 through the water phase, and sodium carbonate ($Na_2CO_3$) is precipitated out of the solution 1020, according to reaction:

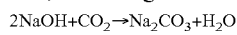

The precipitate is separated by a decantation process 1025 to yield $Na_2CO_3$ 1030.

After all metallic sodium and sodium-containing intermetallic compounds are reacted, the cell is taken out from the alcohol phase and rinsed with water to dissolve the remaining salts 1035 and remove residual alcohol. In some cases, if lead is alloyed with antimony, some intermetallic compounds react with water at high temperature to form stibine, a toxic flammable gas. However, stibine is unstable and decomposes to form metallic antimony and hydrogen gas.

The water rinse is evaporated 1040 to recover the salts 1045. The cell with sodium components removed 1050 is subjected to further separating processes 1055.

Example 4—Disassembly and Recycling by Combination Method

The active materials of liquid metal batteries may contain reactive metals like sodium or lithium, which can be the main source of a reactive hazard in the battery. In some cases, the first step in the battery recycling process is the removal of reactive metals and said metal-containing compounds from the cell, to allow safer separation of the rest of cell materials.

In this example, sodium or sodium-containing components are removed by aqueous treatment (e.g., aqueous treatment in liquid or gaseous form using pure water, iBuOH/water, or partially saturated hydroxide solution), followed by melting to recover other metals. The aqueous treatment step results in a cell with no reactive metal, but still having the cathode (e.g., Pb/Sb alloy), graphite sheath, Fe/Ni foam, and stainless steel casing that are integrated.

The melt and separate procedure of Example 1 is used to recover the Pb from the cell that has had sodium removed. The melting procedure is not performed in an argon atmosphere, and is relatively faster and easier, because the risk of uncontrolled exothermal energy release, and fire due to reactive metal(s) has been removed. The Pb (or Pb/Sb alloy in some examples) is melted off from the steel container at around 300 to 380° C. and collected, leaving the graphite sheath, the Fe/Ni foam and the container itself to be physically separated.

In some cases, aqueous treatment can be used to remove residual amounts of reactive metal remaining in the cell (e.g., to remove any residual sodium) following an earlier processing step (e.g., a melting step), such as with a solution of water in isobutyl alcohol according to Example 3, or otherwise described herein. For example, residual reactive metal contaminants present in small quantities within the cell can be removed by soaking the remainder of the cell in water. As most of the reactive metal (as well as the cathode) has been removed in the previous step, the aqueous treatment step is relatively fast and results in a cell with no reactive metal, but still having the stainless steel casing, graphite sheath, and iron-nickel foam. These components can be separated mechanically for further processing, and/or further chemically treated in situ (e.g., in the container). Thus, the aqueous treatment can be used as an initial processing step as well as a complementary or optional processing step. In some situations, the methods of the disclosure can include selecting processing steps (e.g., sequence, extent of processing) in accordance with value and/or ease of disposal/resale of recovered materials. Further, in some situations, the methods of the disclosure can include selecting processing steps (e.g., sequence, extent of processing) in accordance with operating cost, including energy use and cost of materials.

Electrochemical cells of the disclosure may be capable of storing (and/or taking in) a suitably large amount of energy. In some instances, a cell is capable of storing (and/or taking in) about 1 Wh, about 5 Wh, 25 Wh, about 50 Wh, about 100 Wh, about 500 Wh, about 1 kWh, about 1.5 kWh, about 2 kWh, about 3 kWh, or about 5 kWh. In some instances, the battery is capable of storing (and/or taking in) at least about 1 Wh, at least about 5 Wh, at least about 25 Wh, at least about 50 Wh, at least about 100 Wh, at least about 500 Wh, at least about 1 kWh, at least about 1.5 kWh, at least about 2 kWh, at least about 3 kWh, or at least about 5 kWh. It is recognized that the amount of energy stored in an electrochemical cell and/or battery may be less than the amount of energy taken into the electrochemical cell and/or battery (e.g., due to inefficiencies and losses).

The compilation of cells (i.e., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing a suitably large amount of energy for use with a power grid (i.e., a grid-scale battery) or other loads or uses. In some instances, a battery is capable of storing (and/or taking in) about 5 kWh, 25 kWh, about 50 kWh, about 100 kWh, about 500 kWh, about 1 MWh, about 1.5 MWh, about 2 MWh, about 3 MWh, or about 5 MWh. In some instances, the battery is capable of storing (and/or taking in) at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, or at least about 5 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of 100 cells is capable of storing at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

The electrochemical cells can be arranged in series and/or parallel to form an electrochemical energy storage system (i.e., battery). The energy storage system can comprise modules, packs, cores, and/or pods of electrochemical cells surrounded by a frame.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

Systems, apparatuses and methods of the disclosure may be combined with or modified by other systems, apparatuses and/or methods, such as batteries and battery components described in U.S. Statutory Invention Registration No. H816 ("STIBINE FILTER AND ANTIMONIAL LEAD ACID BATTERIES"), U.S. Pat. No. 2,587,443 ("BATTERY CAP APPARATUS"), U.S. Pat. No. 3,663,295 ("STORAGE BATTERY ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), and U.S. Patent Publication No. 2012/0104990 ("ALKALI METAL ION BATTERY WITH BIMETALLIC ELECTRODE"), which are entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for recycling a battery, the method comprising:
   (a) providing an electrochemical cell of the battery, the electrochemical cell comprising:
     a first electrode comprising a first material, wherein the first electrode is an anode during discharge, and wherein the first material is in a liquid state at an operating temperature of the electrochemical cell;
     a second electrode comprising a second material, wherein the second electrode is a cathode during discharge, and wherein at least a portion of the second material is in a liquid state at the operating temperature of the electrochemical cell;
     an electrolyte disposed between the first electrode and the second electrode, wherein the electrolyte is capable of conducting ions of the first material that dissolve into the electrolyte during discharge or charge at the operating temperature of the electrochemical cell, and wherein at least a portion of the electrolyte is in a liquid state at the operating temperature of the electrochemical cell; and
     a solid or semi-solid intermetallic layer adjacent to the electrolyte, wherein the solid or semi-solid intermetallic layer is formed of the first and second materials; and
   (b) recovering at least a portion of the second material from the electrochemical cell to recycle the battery, wherein recovering the at least a portion of the second material from the electrochemical cell comprises (i) sequentially melting at least two of the first electrode, second electrode, electrolyte, and/or intermetallic layer, (ii) immersing the electrochemical cell in water at a rate such that a reaction between the water and a reactive material of the first electrode, second electrode, electrolyte, and/or intermetallic layer does not produce an uncontrollable release of energy, or (iii) removing a reactive material from the electrochemical cell by contacting the first electrode, second electrode, electrolyte and/or intermetallic layer with superheated steam.

2. The method of claim 1, wherein the first material is a liquid metal.

3. The method of claim 1, wherein the second material includes one or more of a metal, metalloid and a non-metal.

4. The method of claim 1, further comprising recovering antimony from the electrochemical cell.

5. The method of claim 1, wherein the solid or semi-solid intermetallic layer comprises an alloyed product of the first and second materials.

6. The method of claim 1, wherein the solid or semi-solid intermetallic layer comprises antimony.

7. The method of claim 1, further comprising recovering at least a portion of the first material from the solid or semi-solid intermetallic layer.

8. The method of claim 1, wherein the electrochemical cell comprises a reactive metal.

9. The method of claim 8, wherein the reactive metal includes lithium, sodium, potassium, magnesium or calcium.

10. The method of claim 1, wherein the operating temperature of the electrochemical cell is at least about 100° C.

11. The method of claim 10, wherein the operating temperature of the electrochemical cell is at least about 250° C.

12. The method of claim 1, wherein the first electrode comprises lithium, sodium, potassium, rubidium, cesium, magnesium, barium, calcium, or combinations thereof.

13. The method of claim 1, wherein the second electrode comprises zinc, cadmium, mercury, aluminum, gallium, indium, silicon, germanium, tin, lead, arsenic, bismuth, antimony, tellurium, selenium, or combinations thereof.

14. The method of claim 1, wherein the ions of the first material are formed when the first material releases one or more electrons (i) at the first electrode during discharge or (ii) at the second electrode during charge.

15. The method of claim 1, further comprising recovering at least a portion of the second material from the electrochemical cell when the electrochemical cell is in a cooled state relative to the operating temperature of the electrochemical cell.

16. The method of claim 15, wherein the electrochemical cell is in a solidified state.

17. The method of claim 1, wherein the electrochemical cell has an energy storage capacity of at least about 25 Wh.

18. The method of claim 1, wherein the solid or semi-solid intermetallic layer is between the electrolyte and the second electrode or within the second electrode.

19. The method of claim 1, wherein the electrochemical cell further comprises a stainless steel casing and wherein the stainless steel casing is recovered and/or recycled.

20. The method of claim 1, wherein recovering the at least a portion of the second material from the electrochemical cell comprises sequentially melting at least two of the first electrode, second electrode, electrolyte, and/or intermetallic layer.

21. The method of claim 1, wherein recovering the at least a portion of the second material from the electrochemical cell comprises immersing the electrochemical cell in water at a rate such that a reaction between the water and a reactive material of the first electrode, second electrode, electrolyte, and/or intermetallic layer does not produce an uncontrollable release of energy.

22. The method of claim 21, wherein the rate of immersing the electrochemical cell is proportional to the rate of gas production.

23. The method of claim 1, wherein recovering the at least a portion of the second material from the electrochemical cell comprises removing a reactive material from the electrochemical cell by contacting the first electrode, second electrode, electrolyte, and/or intermetallic layer with superheated steam.

* * * * *